J. SCHNEIBLE.
MANUFACTURE OF BEVERAGES.
APPLICATION FILED JUNE 27, 1917.
1,311,251.
Patented July 29, 1919.
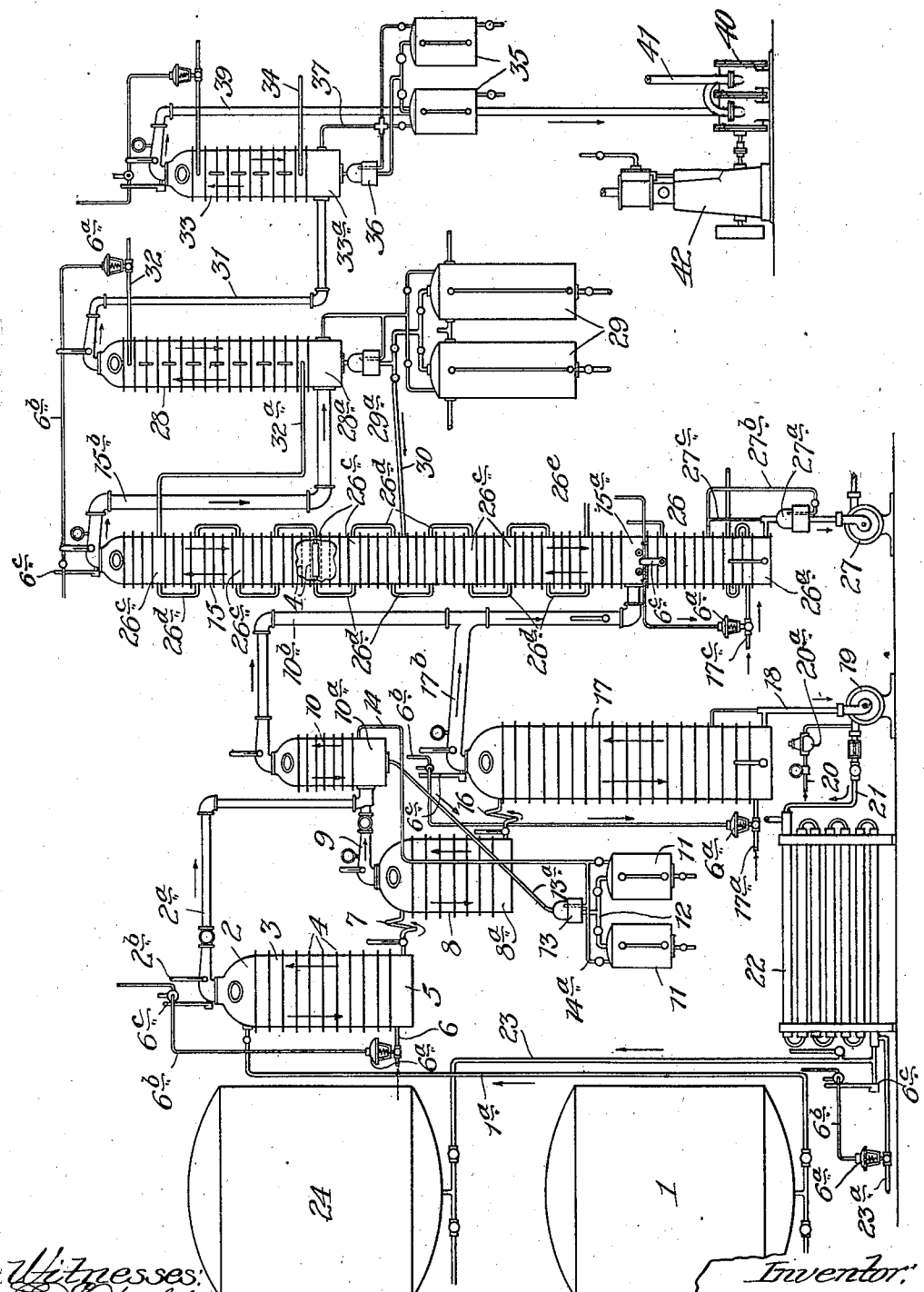

UNITED STATES PATENT OFFICE.

JOSEPH SCHNEIBLE, OF CHICAGO, ILLINOIS.

MANUFACTURE OF BEVERAGES.

1,311,251.	Specification of Letters Patent.	Patented July 29, 1919.

Application filed June 27, 1917. Serial No. 177,239.

*To all whom it may concern:*

Be it known that I, JOSEPH SCHNEIBLE, a citizen of the United States, residing at Chicago, in the county of Cook and State of Illinois, have invented a new and useful Improvement in the Manufacture of Beverages, of which the following is a specification.

The primary object of my invention is to produce wholesome, palatable and nutritious beverages from watery extracts of vegetable matter, including cereals, tubers, plants, fruits, and the like, free from readily fermentable sugars but retaining the other extract matter in solution with its inherent qualities and combinations unchanged, except as they may be modified by yeast fermentation.

To this end, I treat such a watery extract, which is known in the art as a "wash", or a wort, after first removing its contained fermentable sugar by any known or suitable process of fermentation, by subjecting the liquid, modified by such fermentation, to the treatment hereinafter described, employing the apparatus which I have devised for the purpose and which is illustrated in the accompanying drawing by a partly broken view in elevation diagrammatic in character.

In solutions of the kind to be treated by my process, there are always present readily fermentable sugars and relatively small amounts of other organic substances undesirable in the beverages because rendering the latter unwholesome and unpalatable. To get rid of these undesirable sugars, etc., the solution or wash is first attenuated by subjection to yeast fermentation, which acts as a process of purification and digestion while converting the sugars into a mixture consisting mainly of ethyl alcohol and containing, among other bodies, aldehydes and certain esters of lower boiling point than that of ethyl alcohol and hereinafter called "head-products", and bodies of higher boiling-point than that of ethyl alcohol, hereinafter called "tail products" and commonly known as fusel oils. The most important component of the tail-products is amyl alcohol, which forms from 1½ to 2 per cent. of such mixture. Water and ethyl alcohol dissolve each other in all proportions, whereas amyl-alcohol is only slightly soluble in water. These alcohols exert a toxic effect on the human system and should be removed from the liquid containing them (as well as the extract matter desired to be retained in the beverage and including non-reducing sugars, albuminoids, plant salts, etc.), not only because of their toxic effect but also of their producing unpleasant odors and taste and the susceptibility of some of them to oxidation; and the problem, which is solved by my process, is to get rid of these undesirable toxic products of fermentation without detrimentally affecting the taste and physical condition of the valuable constituents of the beverage.

The liquid to be treated, after having been subjected to yeast fermentation and after having been clarified, by preference at low temperature, is introduced into a supply-tank 1 through a valved supply-pipe and is then in condition in the tank for my further treatment throughout which pressures below atmospheric are maintained, as hereinafter described, in various parts of the apparatus through which the matter under treatment passes.

A valved pipe $1^a$ connects the tank with the bonnet 2 of a column-still 3 containing a series of perforated plates 4 (which may be like those shown in the broken part of column 15, hereinafter described) above a steam-chamber 5 in its bottom into which steam, and preferably live steam, is fed from any suitable source (not shown) through a valved pipe 6. The valve in this pipe is provided with a spring-pressed stem, as represented, and is regulated by a well-known thermostat-controlled diaphragm-device $6^a$ (known as a motor-valve) to the diaphragm of which leads, from a suitable source (not shown) a valved air-pressure-pipe $6^b$, the valve in which is regulated by a thermostat, indicated at $6^c$, leading out of and actuated by the temperature in a valved conduit $2^a$ extending from the top of the bonnet 2 and equipped with a thermometer $2^b$.

The cold wash is drawn through pipe $1^a$ into the column 3, in which it passes downwardly into the chamber 5, through a counter current of steam from the latter. The pressure maintained in the column 3 is about 2 to 2½ pounds absolute. The effect of the heat and low pressure in the column 3 is to liberate the carbonic-acid gas and the head-products from the heated liquid, causing it to break into a mass of blubberous foam, and some of these (gas and head-products) are freed and pass out through the conduit $2^a$. The temperature to which the liquid is heated in the column should be high enough to kill any yeast-cells and other micro-organisms contained therein or sufficient to so weaken their vitality as to render them inactive and thus prevent them from producing further fermentation or decomposition in the beverage.

The higher pressure in column 3, controllable by the valve in conduit 2ª, and that in conduit 9, causes the liquid (now hot and in a foamy condition and therefore of sluggish flow) in the chamber 5 to run through a pipe 7 into the bonnet of a column 8, which may be of the same construction as the column 3 except that no steam is supplied to its bottom chamber 8ª. The pressure maintained in the column 8 is lower than that in the column 3, or about 1½ pounds absolute. The temperature of the hot liquid thus entering the column 8 is higher than its boiling-point under the lower-pressure conditions maintained in that column, and these conditions cause the liquid in entering its bonnet to burst into violent ebullition and rapid volatilization, thereby affording the advantage of the ready diffusibility of the water-vapor, for the purpose of removing from the liquid the tail-products because of their ready distillation in a current of steam. Furthermore, the carbonic-acid gas and head-products which have not passed through the bonnet of distilling column 3, are liberated by this bursting action in the bonnet of column 8 and act as a packing in ejecting the tail-products out of the column 8.

The carbon-dioxid gas and other products thus liberated in the column 3 pass through the conduit 2ª and mix with the vapors discharging from the bonnet of column 8 through a valved conduit 9, into which the conduit 2ª discharges and which enters a chamber 10ª in the bottom of a column 10, of a construction similar to that of the column 8, and in which they ascend and separate out the tail-products by condensation, the condensate carrying these tail-products accumulating on the perforated plates in the column 10 and collecting in the chamber 10ª. A pair of similar receiving drums, shown at 11, has its members connected at their upper ends by a valved pipe 12 surmounted by a test-jar 13, into which a pipe 13ª leads from the bottom of the chamber 10ª, so that the contents of one drum may be withdrawn while the other drum is filling, thus without interrupting the continuity of the process. A valved vent-pipe 14 is shown leading from the upper part of the chamber 10ª to one of the drums 11 and has a valved branch 14ª leading to the other drum and a branch shown leading upwardly into the test-jar bonnet to enable the contents of the chamber 10ª to flow unobstructedly through the liquid-conducting pipe 13ª.

The carbon-dioxid gas and head-products issuing out of the column 3 are materially cooler than the vapors issuing out of the column 8, which they meet at the inlet to the column 10, the latter forming a tail-product cut-off, wherein the gas, head-products, excess vapors and traces of ethyl alcohol rise and pass out through a valved conduit 10ᵇ leading from the bonnet of that column to the base of a reflux-column 15.

The liquid which collects in the chamber 8ª, or bottom of column 8, now substantially rid of carbonic-acid gas and head and tail-products, flows through a pipe 16 into the bonnet of a dealcoholizing column 17, which may be of the same construction as but is shown to be like but higher than the column 3 and receives its supply of steam through a valved pipe 17ª regulated by a diaphragm device 6ª automatically operated by air-pressure through a pipe 6ᵇ controlled by a thermostat 6ᶜ leading out of and actuated by the temperature in a conduit 17ᵇ connecting the bonnet of column 17 with the conduit 10ᵇ. The liquid entering column 17 through the pipe 16 is subjected in the column to distillation to liberate its contained ethyl alcohol.

The residual liquid which collects in the bottom chamber of the dealcoholizing column 17 is withdrawn therefrom through a pipe 18 by an ejector-pump 19 and is saturated with carbonic-acid gas introduced into the liquid, through a pipe 20 containing a pressure-regulator, indicated at 20ª, in its course from the pump through a valved lantern-containing pipe 21 to cooler 22, wherein the liquid, freed of head and tail-products and ethyl alcohol is cooled and absorbs carbonic acid while cooling to form the resultant beverage. From the cooler, the beverage passes through a valved discharge-conduit 23 into a storage-tank 24. A pipe 23ª for introducing a refrigerant (brine) into the cooler 22, is provided with an air-pressure controlled diaphragm-device 6ª and a branch 6ᵇ from which a thermostat, indicated at 6ᶜ, extends into the liquid-conduit 23 for regulating air pressure to the diaphragm which operates the valve in the pipe 23ª to control the quantity of refrigerant supplied therethrough to the coil in the cooler (enveloping the coil through which the beverage courses) for cooling the beverage to a predetermined low temperature.

The vapors carrying the ethyl alcohol rise into the bonnet of the dealcoholizing column 17 and pass through conduit 17ᵇ into the condiut 10ᵇ, wherein they mix with the carbonic-acid gas and head-products from column 10, and pass with the latter into the bottom chamber 15ª of the reflux column 15. The reflux-column surmounts a column still 26 provided, like the still formed by the column 17, with a bottom chamber 26ª in open communication with the still 26, and a series of perforated plates. Similar series of these perforated plates are provided at uniform intervals throughout the reflux-column, and each series is separated from the next in order by a closed hollow plate or box 26ᶜ arranged in the column to permit the vapors rising and descending therein to pass them in flowing from one to another of the series of perforated plates in that column. The boxes 26ᶜ form cooling plates intercommunicating each with the one below it by an external pipe 26ᵈ disposed as illustrated, the lowermost of these hollow plates discharging through a pipe 26ᵉ to any desired point, as to a sewer.

The lower still-section 26 of the reflux-column is supplied with preferably dry steam through a valved pipe 17ᶜ, the valve in which is operated by a diaphragm-device 6ª worked by air-pressure controlled by a thermostat as in the case of each of the other stills already described. In the column 15 the carbonic-acid gas, head-product and ethyl-alcohol vapors and water-vapors associated with them are cooled in rising by contact with the hollow plates 26ᶜ and undergo refluxing, these plates being supplied with cooling water as hereinafter explained. In refluxing, the vapors are gradually deprived by condensation of the water-vapors, which descend in the column and finally pass into the vapor-intake chamber 15ª, whence they enter the still 26 and are re-distilled therein to drive off their contained remnant of ethyl alcohol which again ascends into the reflux-column leaving the dealcoholized water to be withdrawn from the still-bottom 26ª and out of the system by the operation of an ejector-pump shown at 27, discharging to any desired point, as to a sewer. Interposed in the pipe leading to the pump 27 is a test-jar 27ª into which a vent-pipe 27ᵇ and a branch 27ᶜ thereof lead, as represented. The thermostat 6ᶜ on the still 26 is shown to be placed below the outlet-end of the conduit 10ᵇ for the vapors coming from the dealcoholizing column 17 to produce a regulation whereby the rising alcohol vapors in still 26 meet the vapors coming into the latter from column 17 at a temperature suitable to that of the in-coming vapors.

The carbonic-acid gas, head-products and ethyl-alcohol vapors now substantially freed in the reflux-column of water-vapors, issue from the bonnet of that column and pass through a conduit 15ᵇ into the bottom-chamber 28ª of an alcohol-condenser column 28, containing a series of hollow plates 26ᶜ connected by pipes 26ᵈ, like those in the reflux-column 15. In the column 28 the ethyl alcohol is liquefied and descends through a test-jar 29ª controllably communicating with a pair of similar receiving drums 29 for ethyl alcohol in the same manner and for the same purpose as described of the communication of the test-jar 13 with the drums 11; though a valved pipe 30, interposed in this communication, is provided for re-introducing the ethyl alcohol into the reflux-column for re-treatment therein as often as required, to attain the alcohol of desired strength, whereupon the valve in the pipe 30 is closed and the valves controlling communication of the test-jar with either drum 29 are gradually opened to permit the ethyl alcohol to drop into it.

A thermostat 6ᶜ is shown on the bonnet of the reflux-condenser 15 for regulating the supply of compressed air through a pipe 6ᵇ to a diaphragm-device 6ª, all like the corresponding parts already described, for operating the valve in a pipe 32 to control the flow of condensing water supplied through the pipe to the column 28. Another pipe 32ª takes the condenser-water used in the alcohol condenser 28 from the lower end of the latter into the uppermost plate 26ᶜ in the reflux-column 15, to flow downwardly through the pipes 26ᵈ and the successive plates 26ᶜ and discharge at the pipe 26ᵉ, as to a sewer.

The uncondensed gases and vapors passing out of the alcohol-condenser 28 at its bonnet are withdrawn from the latter through a conduit 31 into the bottom-chamber 33ª of a head-products condenser 33, like the condenser 28. A refrigerant (as brine) is supplied from a tank (not shown) to the upper end of the condenser 33 through a valved pipe, the valve of which is operated by motor-valve means like those shown and described for the purpose in connection with the pipes 32, 17ᶜ, 17ª and 6, and the refrigerant is returned through a pipe 34 from the lower part of the condenser 33, to the tank. In this condenser 33 the temperature of the head-products is sufficiently reduced to liquefy them; and the liquid drops to either of a pair of receiving drums 35 through a test-jar 36 and the valved pipe-connections shown with the drums. A vent-pipe 37 leads from the chamber 33ª into the drums 35 and into the bonnet of the test-jar 36 to prevent back-pressure while discharging the liquefied head-products directly from the chamber 33ª through the test-jar into the respective receiving drums through its illustrated valved pipe-connections therewith.

Uncondensed gases in the condenser 33 are withdrawn from its bonnet through a conduit 39, leading to an exhaust-pump 40 which discharges through a pipe 41 to any desired point and is driven by a suitable engine 42, or motor.

The apparatus is equipped at suitable points with control thermometers and pressure gages, as represented.

The exhauster 40 maintains suitable sub-atmospheric pressure throughout the entire apparatus and, assisted by the intervening condensers, causes rapid evaporation and distillation in the respective columns; and by proper control the pressure, as in column 3, is so regulated as to cause the bursting of the heated liquid that issues from it into the next column, as column 8, wherein a lower pressure is maintained, as hereinbefore described, causing in the former the violent ebullition and rapid volatilization referred to and liberation of the "tail-products" from the liquid with retention therein of the ethyl alcohol in a practically pure condition.

It may be mentioned that liquid passing through the pipe 18 should be below the boiling-point at the pressure to which the liquid is subjected within the pump-casing, to prevent the pump from becoming vapor-bound. That condition obtains where the pipe 18 is under low temperature, as it is, in the usual practice, in a refrigerated room.

Flavoring of the beverage may be performed either before or after dealcoholization of the liquid, depending on the nature of the flavoring material employed; and the type of yeast used will aid in and characterize the flavor.

As will be apparent, by my process thus described, which involves a continuous operation, the fermented watery extract is treated without subjecting it to any contaminating influences, such as extreme heat, long exposure to distilling conditions and to refluxing and reabsorption of volatile tail-products which latter have such obnoxious taste and odor that even a very small quantity remaining in the beverage after the ethyl alcohol has been removed is highly objectionable. Furthermore, the recovered head and tail products, as well as the pure ethyl alcohol form valuable products of my process, leaving the pure beverage not only free from toxic products of fermentation but of refreshing and palatable quality and embodying wholesome tonic and nutritious properties highly desirable in a beverage, thereby peculiarly adapting it to be consumed in large quantities without detriment to the consumer which renders my improved beverage especially suitable for those whose occupations require frequent and copious drinking for thirst-quenching, such as the workmen in steel-plants and the like.

What I claim is:

1. The continuous process for treating fermented liquor which consists in heating the same, then passing the heated liquor into a space in which is maintained a pressure substantially lower than the boiling pressure of the heated liquor and distilling the ethyl alcohol from the remaining liquor.

2. The continuous process for treating fermented liquor which consists in heating the same, then passing the heated liquor into and through a space in which is maintained a pressure substantially lower than the boiling pressure of the heated liquor and subsequently distilling the ethyl alcohol from the remaining liquor.

3. The continuous process for treating fermented liquor which consists in heating the same, then passing the heated liquor into and through a space in which is maintained a pressure substantially lower than the boiling pressure of the heated liquor, separating the vapors given off therefrom, and subsequently distilling the ethyl alcohol from the remaining liquor.

4. The continuous process for treating fermented liquor which consists in heating the same, then passing the heated liquor into and through a space in which is maintained a pressure substantially lower than the boiling pressure of the heated liquor, separating the vapors given off therefrom, subsequently distilling the ethyl alcohol from the remaining liquor, dissociating the water from the alcohol and condensing the alcohol.

5. The continuous process for treating fermented liquor containing albuminous matter which consists in heating the liquor without impairing its contained albumin and then passing the heated liquor into a space in which is maintained a sub-atmospheric pressure substantially lower than the boiling pressure of the heated liquor.

6. The continuous process for treating fermented liquor containing albuminous matter in solution which consists in heating the liquor without impairing its contained albumin, then passing the heated liquor into and through a space in which is maintained a sub-atmospheric pressure substantially lower than the boiling pressure of the heated liquor and subsequently distilling the ethyl alcohol from the remaining liquor.

7. The continuous process for treating fermented liquor containing albuminous matter in solution which consists in heating the liquor without impairing its contained albumin and then passing the heated liquor into and through a space in which is maintained a sub-atmospheric pressure substantially lower than the boiling pressure of the heated liquor, subsequently distilling the ethyl alcohol from the remaining liquor, dissociating the water from the alcoholic vapors, condensing the alcohol and exhausting the uncondensed gases.

JOSEPH SCHNEIBLE.